United States Patent [19]

Taylor et al.

[11] Patent Number: 5,504,770
[45] Date of Patent: Apr. 2, 1996

[54] LIQUID METAL CONFINEMENT CYLINDER FOR OPTICAL DISCHARGE DEVICES

[75] Inventors: Marie E. Taylor; Edward J. Seibert, both of Chalfont, Pa.

[73] Assignee: The United States of America as represented by the Secretary of the Navy, Washington, D.C.

[21] Appl. No.: 172,795

[22] Filed: Dec. 27, 1993

[51] Int. Cl.⁶ .................................................. H01S 3/22
[52] U.S. Cl. ...................................... 372/56; 372/61
[58] Field of Search .......................... 372/56, 61, 87, 372/92, 62

[56] References Cited

U.S. PATENT DOCUMENTS

| | | | |
|---|---|---|---|
| 4,639,926 | 1/1987 | Wang et al. | 372/87 |
| 4,696,011 | 9/1987 | Kearsley | 372/61 |
| 4,794,614 | 12/1988 | Maitland et al. | 372/56 |
| 4,949,354 | 8/1990 | Maitland | 372/87 |
| 4,955,033 | 9/1990 | Maitland et al. | 372/56 |
| 4,956,845 | 9/1990 | Otto et al. | 372/56 |

*Primary Examiner*—Léon Scott, Jr.
*Attorney, Agent, or Firm*—James V. Tura; James B. Bechtel; Susan E. Verona

[57] ABSTRACT

A confinement cylinder is disclosed having opposite end regions and a central region, each acting as reservoirs for holding liquid metal for a metal vapor laser discharge device. The confinement cylinder is located at the central region of the discharge chamber of the laser device and allows the liquid metal to be raised to a temperature sufficient so that the liquid metal may transition into its vapor state, find its way back to the discharge chamber, and actively participate in the production of lasing.

13 Claims, 3 Drawing Sheets

LIQUID METAL CONFINEMENT CYLINDER FOR OPTICAL DISCHARGE DEVICES

The invention described herein may be manufactured and used by and for the Government of the United States of America for governmental purposes without the payment of any royalty thereon or therefor.

BACKGROUND OF THE INVENTION

The present invention relates to metal vapor discharge devices, and more particularly, to a laser device having an enclosure which confines the liquid metal of the laser device to a location whereby the temperature of the liquid metal may be elevated so that the liquid metal transitions from its liquid state to its vapor state thereby allowing it to advantageously contribute to the production of lasing.

One of the most critical components in metal vapor lasers is the vacuum discharge cell which contains a liquid metal. The vacuum discharge cell should confine the liquid metal to a heated region wherein it is subject to temperatures higher than the melting point of metal so that the liquid is transitioned into its vapor state whereby it is enabled to contribute to the intended lasing. Some liquid metals suitable for the use in metal vapor lasers are chemically reactive and vaporize at relatively high temperatures. At these temperatures, the liquid metal is free to flow wherever it can as determined by gravity, the orientation of the vacuum discharge cell, and the surface tension of the liquid metal. Unless means are provided, the liquid metal may disadvantageously flow out of the heated region of the cell and thereby not contribute to the generation of lasing. To prevent migration of the liquid metal out of the heated region of the cell, usually a small amount, commonly termed a "sample," of liquid metal is used and the entire vacuum discharge cell is held in a horizontally level position. Unfortunately, maintaining the discharge cell in the horizontal level position unduly restricts the orientation that may be desired for the metal vapor laser. Historically, several techniques have been used to impede the flow of liquid metal from the heated region when the vacuum discharge cell is oriented to a position other than horizontal.

A laser device having the capability of maintaining a laser medium, such as a liquid metal, in a desired discharge chamber of the laser device in spite of being moved or tilted is disclosed in U.S. Pat. No. 4,696,011 ('011). The laser device of the '011 Patent utilizes a porous element that absorbs the laser medium in its liquid state so that it is always present in the discharge chamber. This device has a disadvantage that the porous metal element may contaminate the liquid metal. In addition, high surface tension liquid metals sometimes cannot be made to "wet" the porous element and also large samples of these liquid metals must sometimes be used.

Another technique for impeding the flow of liquid metal from the heating region of the vacuum discharge cell, is the use of inner and outer concentrically nested ceramic cylinders, with special hole configurations placed into the inner cylinder. The liquid metal is then confined in a well (created by the hole placed through the inner cylinder) and the wall of the outer cylinder. Sometimes, a ceramic compound is used to seal the gap between the inner and outer cylinder portions located around the well. Disadvantages of this method include possible contamination of the liquid metal by the ceramic sealing compound, leakage of an extremely low surface tension liquid metal into the gap region between cylinders, and, more importantly, limitations on the orientation of the vacuum discharge cell away from the restrictive horizontal level position.

Another technique employs the use of various materials to form a "dee"; that is, a small longitudinally sliced tube having sealed ends. This dee contains the liquid metal and is placed in the heated region of the vacuum discharge cell. Disadvantages of this technique include inhibiting a clear path in the discharge region, sometimes referred to as blocking the clear viewing aperture, and the limitation of the vacuum discharge cell being oriented away from the restrictive horizontal level position due to the sample size, wall height of the dee, and the means by which the dee is secured inside the vacuum discharge cell.

Still further, heat pipe ovens have also been used not only to contain the liquid metal in the heated region, but also to recycle their produced recondensed metal vapor back into the heated region of the cell. These devices consist of a screen-like material, called a wick, which lines the central region of the vacuum discharge cell with a large quantity of liquid metal to "wet" the wick. Capillary action allows recondensed metal to be drawn back into a heated central region of the vacuum discharge cell. One disadvantage of this technique is the difficulty in finding a suitable wick material that will not contaminate the liquid metal being used, and yet still be manufactured with appropriate spacing to allow the capillary action to occur. The wick also causes a potential hazard when used in a discharge plasma. More particularly, the wick presents an alternative low resistance path which disadvantageously allows for a discharge to conduct along this path rather than to be used for breaking down the vapor so that the vapor can contribute to the desired lasing. In addition, careful attention must be given to the thermal gradient through the vacuum discharge cell to ensure that recondensation occurs on the wick material. Since gravity affects the distribution of the liquid metal on a wick, vacuum discharge cell orientation is again restricted to being near horizontal level position.

It is desired that means be provided to allow the liquid metal of the metal vapor laser device to be confined within the heated region of the device without suffering any of the disadvantages of the prior devices. Further, it is desired this means be easily implemented to accommodate different vacuum discharge cells having different dimensions.

SUMMARY OF THE INVENTION

The present invention is directed to a discharge device having a cylindrical element that advantageously confines any liquid metal of the device to the heated region of the device so that the liquid metal may be vaporized and advantageously contribute to the production of lasing; i.e., to the generation of coherent electromagnetic radiation in the ultraviolet, visible, or infrared region of the spectrum.

In one embodiment, the discharge device comprises a first hollow elongated element composed of an electrically nonconductive material and a hollow cylindrical element composed of an electrically conductive material and disposed within the central region of the elongated element. The discharge device further comprises a pair of electrodes each having a tip respectively disposed at opposite ends of the first hollow element with the interior serving as a discharge chamber. In another embodiment, the discharge device further comprises a second hollow elongated element which separates the hollow cylindrical element from the interior of the first hollow elongated element. The second hollow element provides electrical isolation of the hollow cylindrical element from the discharge plasma used to excite the metal vapor. The second hollow element has an interior which forms a discharge chamber having opposite ends that are separated by a central portion having a plurality of apertures. In both embodiments, the hollow cylindrical element has reservoirs for holding and confining liquid metal. In operation, and for any orientation of the discharge device, the liquid metal is contained in the cylindrical confinement element and is elevated in temperature so that it is transitioned from its liquid state to its vapor state whereby it is enabled to contribute to the lasing of the device.

Accordingly, it is an object of the present invention to provide a hollow cylindrical element that confines or keeps the liquid metal in the region of the discharge chamber whereby its temperature may be elevated so that the liquid metal may transition into its vapor state allowing it to contribute to lasing.

It is a further object of the present invention to provide means for easily locating the hollow cylindrical element at a desired position relative to the discharge chamber formed by the interior of the first or second elongated element.

Further, it is an object of the present invention to confine the liquid metal to the desired region of the discharge chamber so as to allow for its vaporization in spite of any orientation in which the device is placed.

Other objects, advantageous and novel features of the invention will be apparent from the following detailed description when considered in conjunction with the accompanying drawing.

DETAIL DESCRIPTION OF THE PREFERRED EMBODIMENTS

Figure 1:
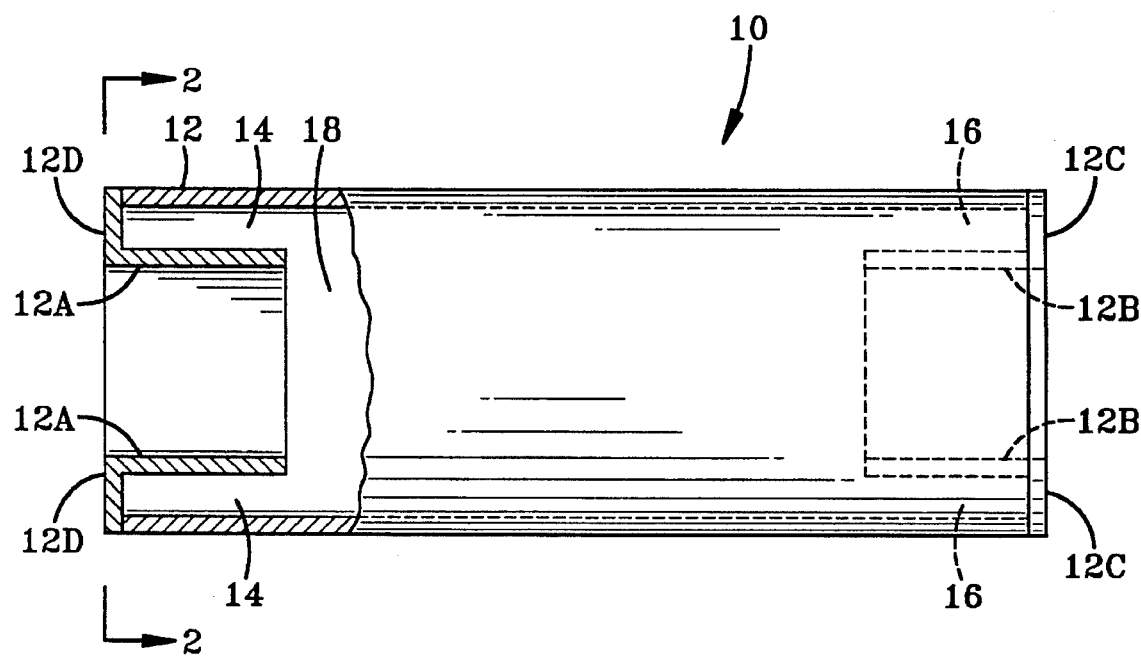
FIG. 1 is a longitudinal section, partially in section, illustrating the confinement cylinder for the liquid metal of a metal vapor discharge device.

With reference to the drawings, wherein in the same reference numbers are used to indicate the same elements, there is shown in FIG. 1, partially in section, a hollow, cylindrical element serving as a liquid metal confinement cylinder 10 of the present invention. The confinement cylinder 10 is typically electrically conductive. The confinement cylinder 10 confines liquid metal of a metal vapor discharge device to a desired location so that the discharge device may have any orientation desired, while still allowing the confined liquid metal to contribute to the lasing produced by the discharge device. Although the confinement cylinder 10 is primarily used in a metal vapor discharge device that produces lasing, it should be recognized that the confinement cylinder has a wide variety of applications, such as metal vapor discharge devices wherein the liquid metal operates in the generation of light for commercial purposes including household, industrial and outside lighting applications. Furthermore, the confinement cylinder 10 may be used in non-discharge units for spectroscopic absorption studies, passive atomic line filters or Raman devices.

The confinement cylinder 10 is fabricated from a chemically inert material, such as thoriated tungsten or tantalum that is stable at elevated temperatures. In addition, both of these materials can be fabricated into the desired configuration of the confinement cylinder 10 to be described. Alternative materials that can be used to fabricate the confinement cylinder 10 include stainless steel (possibly lined or plated with some inert coating), cemented ceramic tubes, ceramic composites, a high temperature glass, quartz, sapphire, tungsten, platinum, iridium, molybdenum, thorium, rhodium, thulium, silicon, zirconium and combinations of these materials.

The confinement cylinder 10 comprises an outer exterior wall 12 that is interconnected with inner walls 12A and 12B located at opposite end regions. The exterior wall 12 further comprises circular end faces 12C and 12D also located at opposite regions of the exterior wall 12. The exterior wall 12 is spaced apart from inner walls 12A and 12B, as shown in FIG. 1, by a predetermined distance so as to form reservoirs 14 and 16 respectively. The reservoirs 14 and 16, in cooperation with end faces 12C and 12D, are shaped so as to serve as buckets for holding the liquid metal of the discharge device. The maximum amount of liquid metal that can be contained within the confinement cylinder 10 is determined by the volume made available between the wall 12 and the inner walls 12A and 12B including the end faces 12C and 12D. The walls 12A, 12B and 12 and end faces 12C and 12D define an interior 18 of the confinement cylinder 10. As will be further described, in the horizontal position, the liquid metal sample is confined in the total reservoir defined by the cylindrical wall 12 including inner walls 12A and 12B and the circular end faces 12C and 12D. The confinement cylinder 10 may be further described with reference to FIG. 2, which is a view of the confinement cylinder 10 taken along line 2—2 of FIG. 1.

Figure 2:
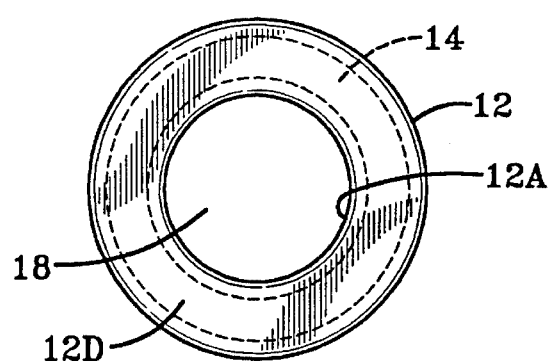
FIG. 2 is a view of the confinement cylinder taken along line 2—2 of FIG. 1.

FIG. 2 illustrates that the reservoir 14 is completely surrounded by outer wall 12, inner wall 12A (all shown in phantom) and end face 12D. Although the shape of the confinement cylinder 10 is preferably shown in FIG. 2 as being cylindrical, other shapes may also be used so long as the selected shape matches the discharge chamber of the device in which the confinement cylinder 10 is used, such as a metal vapor discharge device 20 of a first embodiment shown in FIG. 3.

The metal vapor discharge device 20 further comprises a first hollow elongated cylinder 22 having an interior 24, serving as a discharge chamber, opposite end regions 26 and 28 and a central region 30. The confinement cylinder 10 has its central region 32 formed by the exterior wall 12, serving as a central reservoir, located proximate to the central region 30 of the elongated cylinder 22. The confinement cylinder 10 is located at the central region 30 by means of ceramic spacers 34 and 36 respectively positioned at end regions 26 and 28. The first hollow elongated cylinder is composed of an electrically non-conductive material.

A pair of electrodes 38 and 40 are disposed in opposite ends 26 and 28, respectively, of the discharge chamber 24. The electrodes 38 and 40 are cylindrical but any type of electrodes well known in the art may be used in the practice of this invention. In operation, the electrodes 38 and 40 are connected to a power supply (not shown) by appropriate means. The power system is not considered part of the invention, but it may generate a pulsed discharge at any repetition rate and may even generate a continuous discharge as appropriate to the particular lasing medium. Further, in operation, and as to be further described herein, the reservoirs 14, 16 and 32 confine a liquid metal 42. The liquid metal 42 may be any well-known laser medium, such as copper. The reservoirs 14, 16 and 32 are positioned at a predetermined distance relative to electrodes 38 and 40 so that the liquid metal 42 is placed at a desired location to allow its temperature to be elevated to a relatively high temperature sufficient to cause an appropriate amount of liquid metal to transition into the vapor state. For such operation, current passes through the discharge chamber 24 when an appropriate inert buffer gas is present (as it must be to confine the vaporous metal away from the end regions having optical devices serving as windows as to be described) whether or not there is metal vapor in the discharge chamber 24. As previously mentioned, the location of the confinement cylinder 10 is established by ceramic spacers 34 and 36.

The spacer 34 is positioned between one end of the cylindrical confinement cylinder 10 and an electrode metal sealed vacuum flange conflate 44, whereas spacer 36 is positioned on the other end of the cylinder 10 and between cylinder 10 and another electrode metal-sealed vacuum flange 46. The electrode vacuum flange 44 and 46 both have provisions for accepting cell metal-sealed vacuum flanges 48 and 50 respectively. The cell conflates 48 and 50 come into contact with spacer 34 and with spacer 36 respectively.

Figure 3:
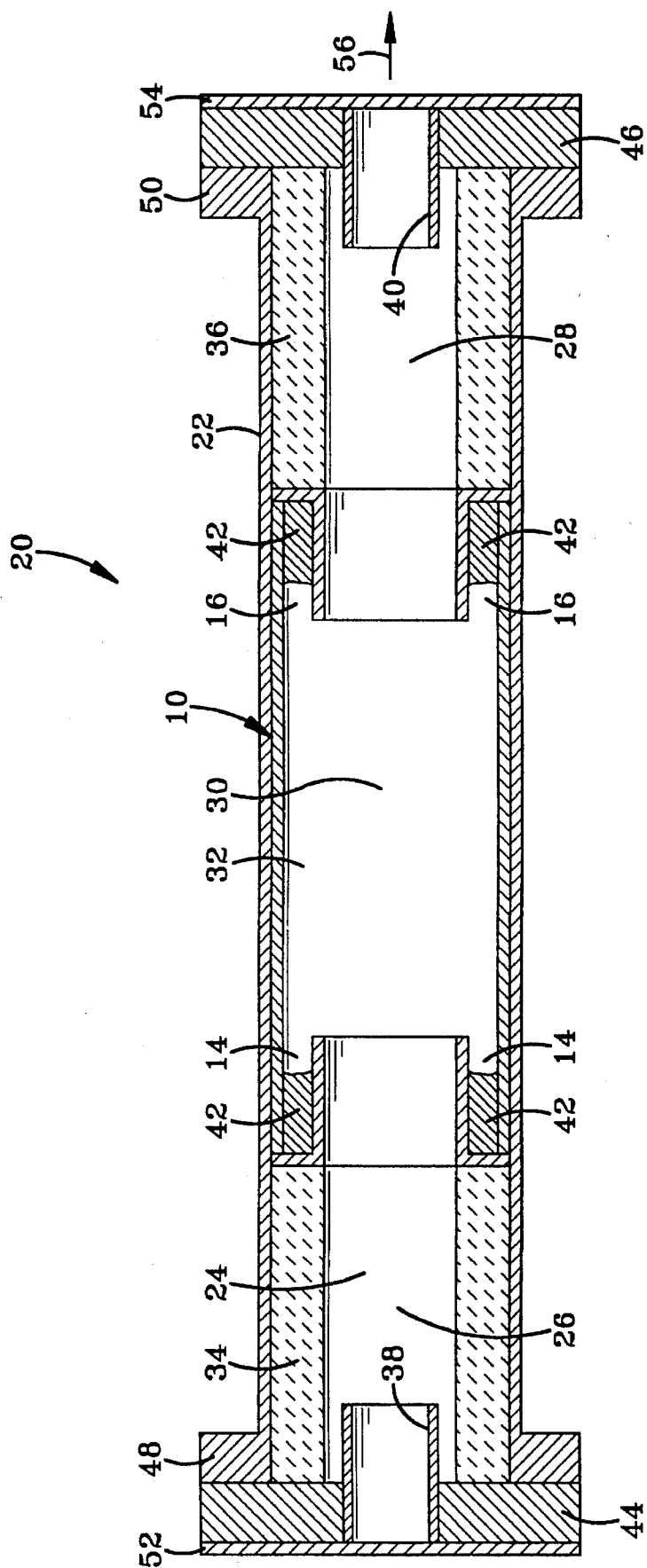
FIG. 3 illustrates one embodiment of a metal vapor discharge device that employs the confinement cylinder of FIGS. 1 and 2.

The metal vapor discharge device 20 further comprises optical devices 52 and 54 depicted adjacent to electrode vacuum flanges 44 and 46, although the devices 52 and 54 may be positioned as desired. In one embodiment, the element 52 is a reflective type, whereas the element 54 is a light transmissive type so that the lasing produced within the discharge chamber 24 is reflected by element 52 causing such lasing to be directed toward and exit from the transparent member 54 as shown in FIG. 3 by the arrow 56. The lasing not reflected by element 52 passes through the transparent member 54. The locations of elements 52 and 54 may be reversed and the produced lasing will exit from the opposite end. Many such arrangements are contemplated by the present invention. The confinement cylinder 10 of the present invention allows for this lasing indicated by arrow 56 regardless of the orientation of the vacuum vapor discharge device 20.

As may be envisioned from FIG. 3, no matter what the orientation of the metal vapor discharge device 20 may be, the liquid metal 42 will be captured by either of the reservoirs 14 or 16, each acting as a bucket. For example, if the left side, as viewed from FIG. 3, of the device 20 is tilted upward, the reservoir 16 will capture and confine the liquid metal 42, and conversely, if the right side of device 20 is tilted upward, the reservoir 14 will capture and confine the liquid metal 42. The liquid metal 42 that is not confined in reservoir 14 or 16 is laying on wall 12. So long as the liquid metal 42 is confined to either reservoir 14 or 16 or along wall 12, the liquid metal 42 is located in a hot region of the metal vapor discharge device 20 so that its temperature will be elevated and so that the liquid metal 42 will transition into its vapor state and thereby make its way back into the discharge chamber 24. So long as the majority of the liquid metal 42 contributes to the production of the lasing, the level of such lasing remains substantially the same and the laser performance is not degraded by any orientation of the metal vapor discharge device 20.

Figure 4:
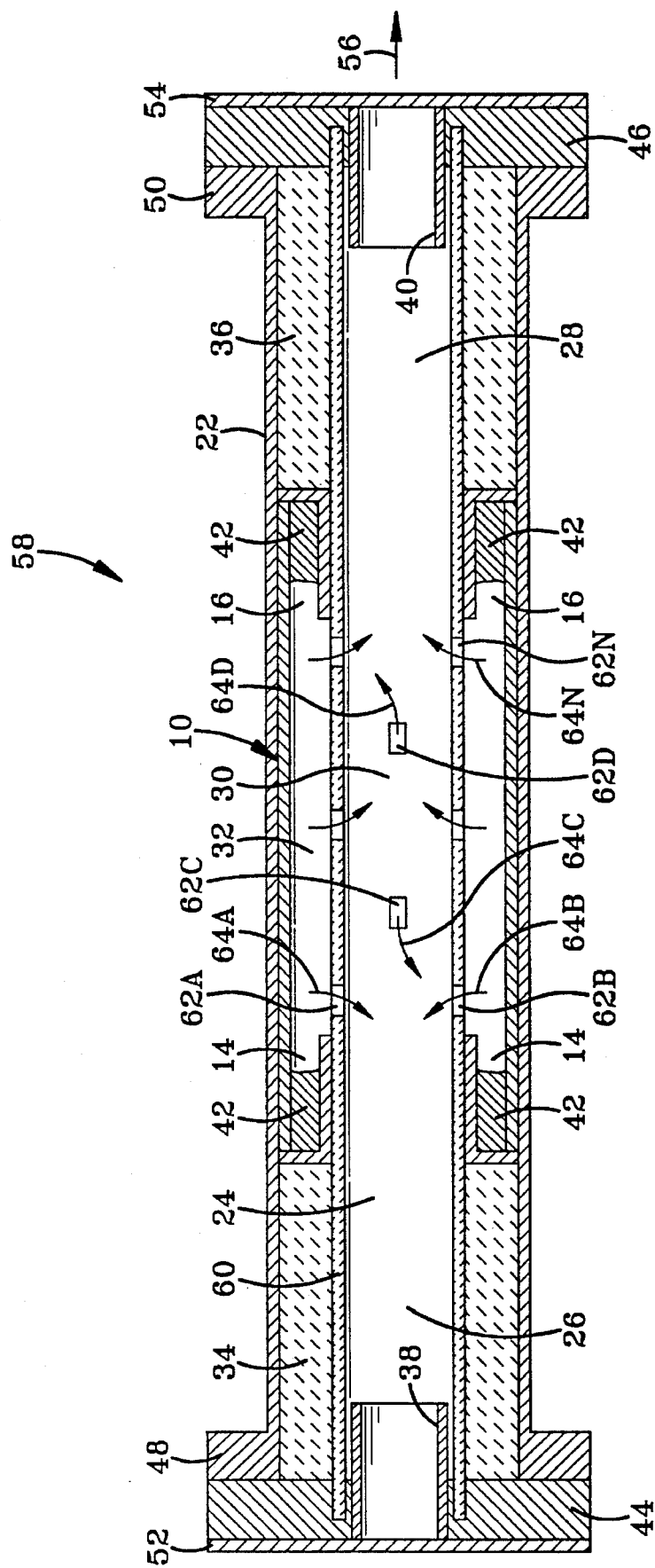
FIG. 4 illustrates another embodiment of a metal vapor discharge device that employs the confinement cylinder of FIGS. 1 and 2.

A second embodiment of a metal vapor discharge device 58 is shown in FIG. 4. The metal vapor discharge device 58 is similar to the metal vapor discharge device 20 of FIG. 3 and uses the same reference numbers to illustrate the similarity, but in addition thereto includes a second hollow elongated element 60. The second hollow elongated element 60 is composed of an electrically non-conductive material and comprises a plurality of apertures 62A, 62B, 62C, 62D and . . . 62N (not all of these apertures are labelled for the sake of clarity). The second hollow elongated element 60 is interposed between the interior 24 of the first hollow elongated element 22 and the confinement cylinder 10 so as to provide electrical isolation therebetween.

The metal vapor discharge device 58, of FIG. 4, operates in the same manner as described for the metal vapor discharge device 20 of FIG. 3. Further, the confinement cylinder 10 shown in both FIGS. 3 and 4 operates in the same manner so that its reservoirs 14 and 16 and its wall 12 capture the liquid metal 42 no matter what the orientation of the metal vapor discharge device 58. So long as the liquid metal 42 is confined to either reservoir 14 or 16 or along the wall 12, the liquid metal 42 is located in a hot region of the metal vapor discharge device 58 so that its temperature will be elevated and the liquid metal 42 will transition into its vapor state and thereby make its way into the discharge chamber 24 by way of apertures 62A, 62B, 62C, 62D and . . . 62N as respectively shown by arrows 64A, 64B, 64C, 64D and . . . 64N.

It should now be appreciated that the practice of the present invention provides for a liquid metal confinement cylinder which allows various embodiments of metal vapor laser discharge devices to operate correctly no matter what their orientation.

It should be further appreciated that the spacers 34 and 36 provide the means for easily locating the liquid metal confinement cylinder 10 into its desired location relative to the discharge chamber and to the electrodes.

Many modifications and variations of the present invention are possible in view of the above disclosure and it is therefore, to be understood, that within the scope of the appending claims, the invention may be practiced otherwise than as specifically described.

What we claim is:

1. A laser having a pair of electrodes respectively disposed at opposite ends thereof, comprising:

a) a first hollow elongated electrically non-conductive element with an interior which forms a discharge chamber having a central portion;

b) a confinement cylinder located within the central portion of said first hollow element, said confinement cylinder having an exterior wall with opposite end regions each shaped to serve as a reservoir and a central region serving as a central reservoir; and c) a liquid metal serving as a lasing medium and contained by said confinement cylinder, said confinement cylinder containing said liquid metal in at least one of said opposite end regions reservoirs and central reservoir, said liquid metal being raised in temperature so that it is transitioned into its vapor state whereby it contributes to the production of lasing of said laser.

2. A laser according to claim 1 further comprising ceramic spacers located on both ends of said confinement cylinder so that said confinement cylinder is kept at said central portion of said discharge chamber.

3. A laser according to claim 2 further comprising a second hollow elongated electrically non-conductive element interposed between said interior of such first hollow elongated element and said confinement cylinder, said second hollow element having a plurality of apertures.

4. A laser according to claim 3 further comprising transparent means having provisions for confining and sealing said ceramic spacers, said electrodes, said first and second hollow elements, and said confinement cylinder.

5. A laser according to claim 4 further comprising a reflective element located at one end of said discharge chamber and a light transmissive element located at the other end of said discharge chamber.

6. A laser according to claim 1, wherein said confinement cylinder is formed by a chemically inert material selected from the group comprising thoriated tungsten and tantalum.

7. A laser according to claim 1, wherein said confinement cylinder is of a material selected from the group comprising stainless steel having a coating of inert material thereon, cemented ceramic tubes, ceramic composites, a high temperature glass, quartz, sapphire, tungsten, platinum, iridium, molybdenum, thorium, rhodium, thulium, silicon, zirconium and combinations thereof.

8. A laser according to claim 1, wherein said confinement cylinder confines at least some of said liquid metal in one of its reservoirs regardless of orientation of the laser.

9. A confinement device for use with a metal vapor laser containing a liquid metal whose vapor state contributes to the production of lasing, said confinement device comprising:

a) a hollow element having a cylindrical shape and an exterior wall with opposite end regions each shaped to serve as a reservoir and a central region serving as a central reservoir; and b) ceramic spacers being located so that said hollow element having a cylindrical shape is adapted to be centrally in a metal vapor laser.

10. A laser having a pair of electrodes respectively disposed at opposite ends thereof, comprising:

a) a first cylindrical, hollow, electrically non-conductive element with an interior which forms a discharge chamber having a central portion;

b) a confinement cylinder enclosing at least the central portion of said first hollow element, said confinement cylinder having an exterior wall with opposite end regions reservoirs each shaped to serve as a reservoir and a central region serving as a central reservoir;

c) liquid metal serving as a laser medium and contained by said confinement cylinder, said confinement cylinder containing said liquid metal in at least one of said opposite end regions reservoirs and central reservoir, said liquid metal being vaporized so as to contribute to the production of lasing of said laser;

d) a second, hollow, elongated, electrically non-conductive element having a plurality of apertures and interposed between said interior of said first hollow element and said confinement cylinder; and e) a pair of optical members one being transparent and the other being reflective and both being arranged so that the lasing produced by said laser exits from one end of said discharge chamber.

11. A laser according to claim 10 further comprising ceramic spacers located so that said confinement cylinder is kept at said central portion of said first cylindrical element.

12. A laser according to claim 11, wherein said spacers are of an electrically insulating material.

13. A laser according to claim 10, wherein said confinement cylinder is selected from the group of materials comprising thoriated tungsten and tantalum.

\* \* \* \* \*